(12) United States Patent
Cheng et al.

(10) Patent No.: US 11,210,136 B2
(45) Date of Patent: Dec. 28, 2021

(54) SYSTEMS AND METHODS FOR AN OPERATING SYSTEM MODULE FOR A DATA PROCESSING ACCELERATOR

(71) Applicant: Baidu USA LLC, Sunnyvale, CA (US)

(72) Inventors: Yueqiang Cheng, Sunnyvale, CA (US); Yong Liu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 194 days.

(21) Appl. No.: 16/709,468

(22) Filed: Dec. 10, 2019

(65) Prior Publication Data

US 2021/0173701 A1 Jun. 10, 2021

(51) Int. Cl.
*G06F 9/48* (2006.01)
*G06N 20/00* (2019.01)
*G06F 9/50* (2006.01)

(52) U.S. Cl.
CPC .......... *G06F 9/4881* (2013.01); *G06F 9/5016* (2013.01); *G06F 9/5027* (2013.01); *G06N 20/00* (2019.01)

(58) Field of Classification Search
CPC .................................................. G06F 9/4881
See application file for complete search history.

(56) References Cited

U.S. PATENT DOCUMENTS

| | | | |
|---|---|---|---|
| 642,945 A | 2/1900 | Wright | |
| 10,813,001 B1 | 10/2020 | Ibarra | |
| 2004/0143645 A1* | 7/2004 | Cheenath | H04L 29/06 709/218 |
| 2006/0248142 A1* | 11/2006 | Ishizaki | H04L 41/5035 709/203 |
| 2011/0072270 A1 | 3/2011 | Little et al. | |
| 2015/0195264 A1 | 7/2015 | Finlayson | |
| 2018/0343258 A1 | 11/2018 | Spies et al. | |
| 2019/0230094 A1 | 7/2019 | Pletea et al. | |
| 2020/0323024 A1 | 10/2020 | Huang et al. | |
| 2020/0389322 A1 | 12/2020 | Selander et al. | |

\* cited by examiner

*Primary Examiner* — Charlie Sun
(74) *Attorney, Agent, or Firm* — Womble Bond Dickinson (US) LLP (57) ABSTRACT

Embodiments disclose systems and methods of an operating system module for a data processing accelerator (DPA). The operating system module can schedule jobs and manage resources (e.g., computing units, memory, IO bandwidth) of the DPA. For one embodiment, a system receives a request, by a DPA, the request sent by an application to execute a data processing task. The system schedules, by an operating system module of the DPA, one or more commands based on one or more kernels to complete the data processing task. The system generates, by the operating system module of the DPA, a completion signal upon completion of the one or more scheduled commands. The system sends a result back to the application acknowledging completion of the one or more commands for the data processing task based on the completion signal.

21 Claims, 9 Drawing Sheets

SYSTEMS AND METHODS FOR AN OPERATING SYSTEM MODULE FOR A DATA PROCESSING ACCELERATOR

TECHNICAL FIELD

Embodiments of the present disclosure relate generally to machine-learning model training and inference. More particularly, embodiments of the disclosure relate to systems and methods for an operating system module of a data processing (DP) accelerator (DPA).

BACKGROUND

Most DPAs require dedicated programs and kernels which are vendor specific. As a result, DPAs typically are configured to communicate with a host computing device for the host (e.g., CPUs system) computing device to manage resources and schedule jobs for the DPAs. As data processing accelerators (DPAs) continue to evolve into high performance accelerated compute devices, more and more applications are written to perform data parallel computations using DPAs similar to general purpose compute devices.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, an NVIDIA® GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Some of the operations include the DP accelerator using an artificial intelligence (AI) model (or a machine-learning model) to perform inferences using data provided by the host device.

AI models or algorithms can include supervised machine learning models, including regression or classification machine learning models. Examples of such models include linear classifiers, nearest neighbors, support vector machines, KNN, random forest, and deep neural networks (such as convolutional neural networks, recurrent neural networks). AI models/algorithms can also include unsupervised machine learning models, including cluster analysis, expectation-maximization algorithms, multivariate analysis, etc.

Embodiments disclose systems and methods of an operating system module for a data processing accelerator (DPA). The operating system module can schedule jobs and manage resources (e.g., computing units, memory, IO bandwidth) for the DPA. For one embodiment, a system receives a request, by a DPA, the request sent by an application to execute a data processing task. The system schedules, by an operating system module of the DPA, one or more commands based on one or more kernels to complete the data processing task. The system generates, by the operating system module of the DPA, a completion signal upon completion of the one or more scheduled commands. The system sends a result back to the application acknowledging completion of the one or more commands for the data processing task based on the completion signal.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

With respect to any of the above aspects, in some embodiments, a host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a link or a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

Figure 1:
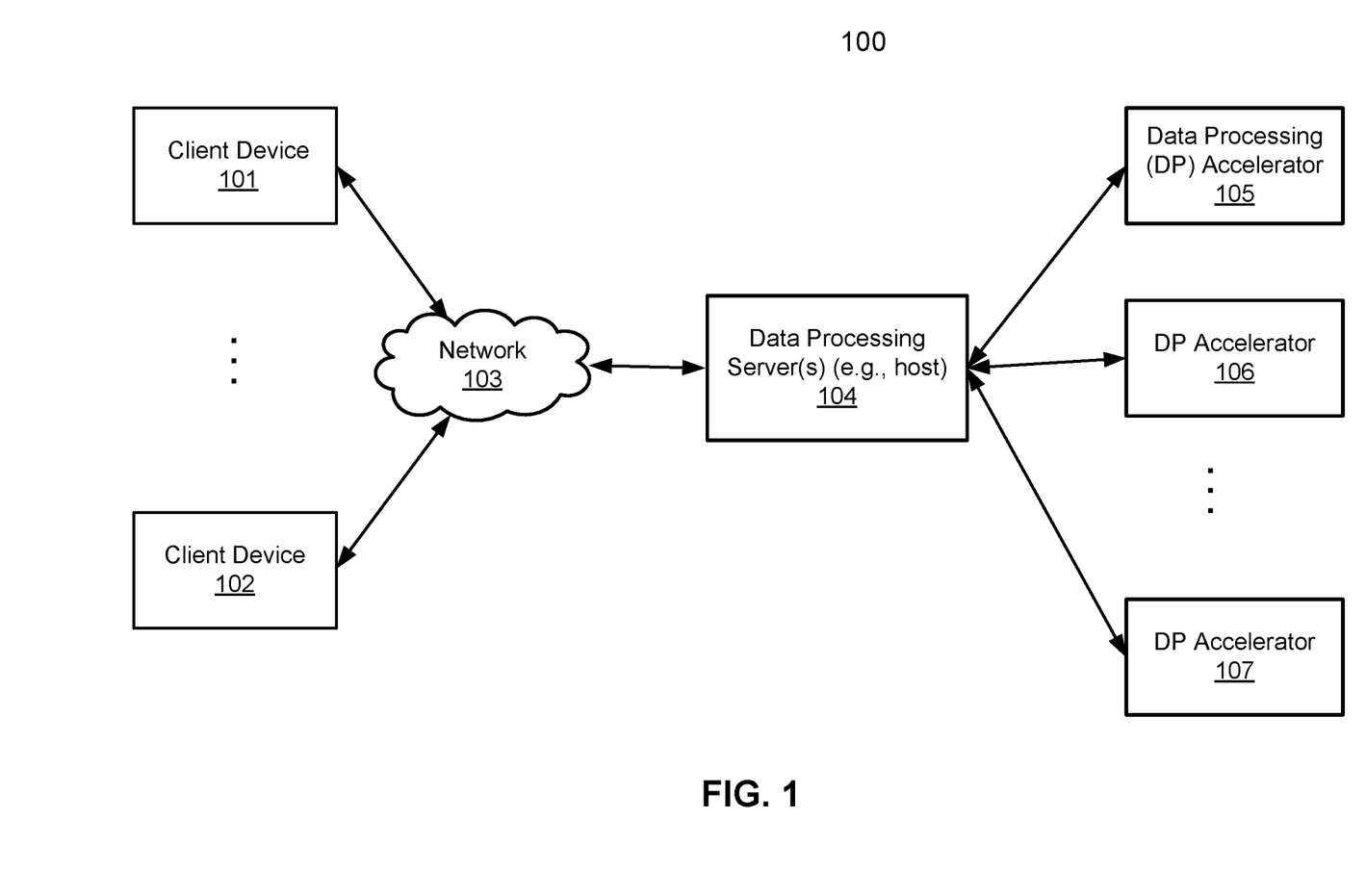
FIG. 1 is a block diagram illustrating an example of a system configuration for communication between a host and data process (DP) accelerators according to one embodiment.

FIG. 1 is a block diagram illustrating an example of a system configuration for communication between a host and data process (DP) accelerators according to one embodiment. Referring to FIG. 1, system configuration 100 includes, but is not limited to, one or more client devices 101-102 communicatively coupled to data processing server (e.g., host) 104 via network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless. The communication between client devices 101-102 and data processing server 104 over network 103 can be secured, e.g., via TLS/SSL.

Data processing server (e.g., host) 104 may be any kind of servers or a cluster of servers, such as Web or cloud servers, application servers, backend servers, or a combination thereof. Server 104 can include an interface to allow a client such as client devices 101-102 to access resources or services provided by server 104. For example, server 104 may be a cloud server or a server of a data center that provides a variety of cloud services to clients, such as, for example, cloud storage, cloud computing services, big data services, modeling services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In another embodiment a client may run remotely an application from server 104 (via a web browser or a web application) and the client can remotely request the application to perform the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu® or alternatively, the DP accelerator may be an AI chipset from NVIDIA®, an Intel®, or some other AI chipset providers.

According to one embodiment, each of the applications accessing any of DP accelerators 105-107 and hosted by DP server 104, also referred to as a host, may be verified that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, a secure connection will be established between host 104 and the corresponding one of the DP accelerator 105-107, such that the data exchanged between host 104 and each of DP accelerators 105-107 is protected against the attacks from malwares.

Figure 2:
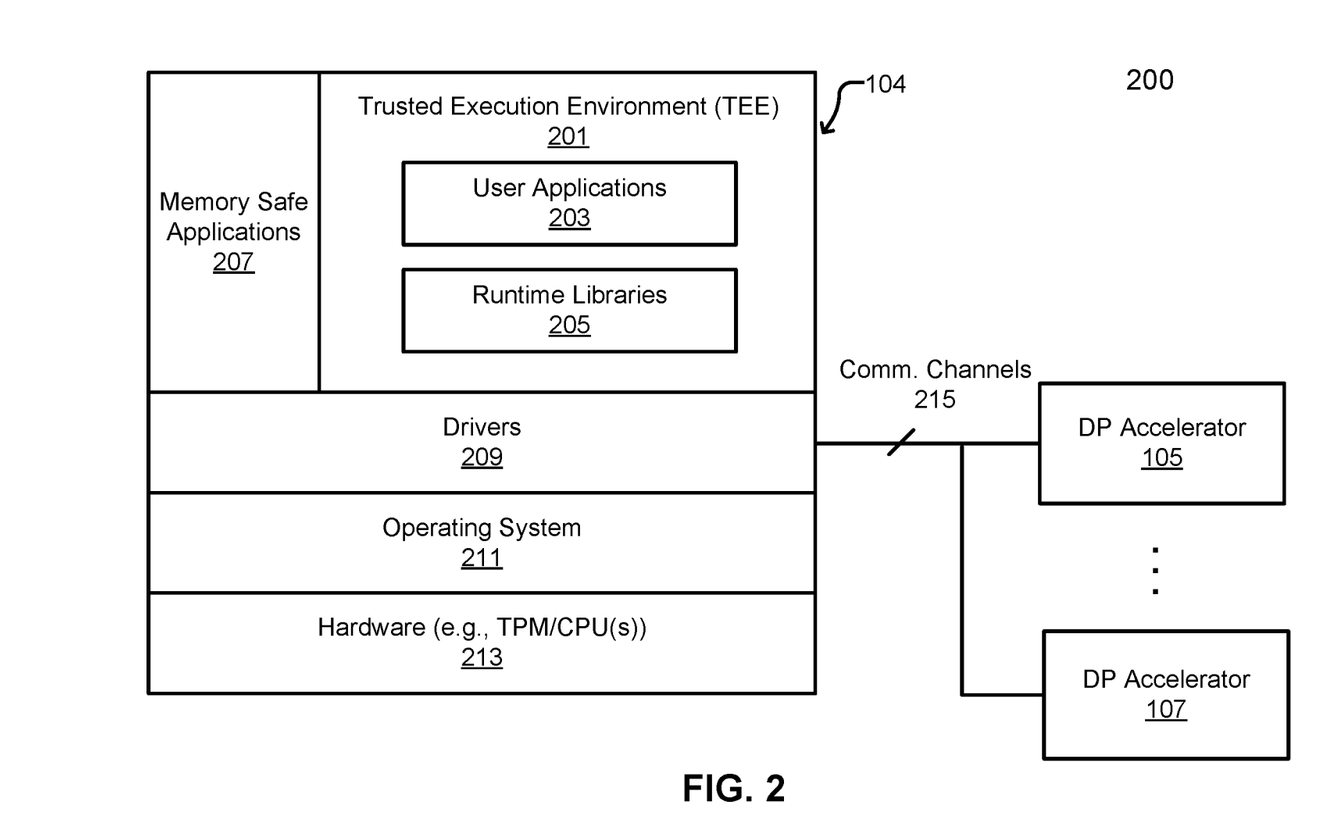
FIG. 2 is a block diagram illustrating an example of a host server in communication with data processing (DP) accelerators according to one embodiment.

FIG. 2 is a block diagram illustrating an example of a host in communication with data processing (DP) accelerators according to one embodiment. System 200 can provide a communication scheme between a host and DP accelerators with or without hardware modifications to the DP accelerators. Referring to FIG. 2, host machine or server 104 can be depicted as a system with one or more layers to be protected from intrusion such as user application 203, runtime libraries 205, driver 209, operating system 211, and hardware 213 (e.g., security module (trusted platform module (TPM))/central processing unit (CPU)). Host machine 104 is typically a CPU system which can control and manage execution jobs on the host system or DP accelerators 105-107. In order to secure a communication channel between the DP accelerators and the host machine, different components may be required to protect different layers of the host system that are prone to data intrusions or attacks. For example, a trusted execution environment (TEE) can protect the user application layer and the runtime library layer from data intrusions.

Referring to FIG. 2, in one embodiment, host system 104 is to include a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secures drivers 209 and operating system (OS) 211 in a working kernel space to communicate with the DP accelerators. Here, drivers 209 are provided by a DP accelerator vendor and can serve as one or more drivers for the user application to control a communication channel between host and DP accelerators. Because TPM chip and secure boot protects the OS and drivers in their kernel space, TPM also effectively protects the drivers 209 and operating system 211.

Since the communication channels for DP accelerators 105-107 may be exclusively occupied by the OS and drivers, thus, the communication channels are also secured through the TPM chip.

In one embodiment, host machine 104 includes trusted execution environment (TEE) 201 which is enforced to be secure by TPM/CPU 213. A TEE is a secure environment. TEE can guarantee code and data which are loaded inside the TEE to be protected with respect to confidentiality and integrity. Examples of a TEE may be Intel software guard extensions (SGX), or AMD secure encrypted virtualization (SEV). Intel SGX and/or AMD SEV can include a set of central processing unit (CPU) instruction codes that allows user-level code to allocate private regions of memory of a CPU that are protected from processes running at higher privilege levels. Here, TEE 201 can protect user applications 203 and runtime libraries 205, where user application 203 and runtime libraries 205 may be provided by end users and DP accelerator vendors, respectively. Here, runtime libraries 205 can convert API calls to commands for execution, configuration, and/or control of the DP accelerators. In one embodiment, runtime libraries 205 provides a predetermined set of (e.g., predefined) kernels for execution by the user applications.

In another embodiment, host machine 104 includes memory safe applications 207 which are implemented using memory safe languages such as Rust, and GoLang, etc. These memory safe applications running on memory safe Linux releases, such as MesaLock Linux, can further protect system 200 from data confidentiality and integrity attacks. However, the operating systems may be any Linux distributions, UNIX, Windows OS, or Mac OS.

In one embodiment, the system can be set up as follows: A memory-safe Linux distribution is installed onto a system (such as host system 104 of FIG. 2) equipped with TPM secure boot. The installation can be performed offline during a manufacturing or preparation stage. The installation can also ensure that applications of a user space of the host system are programmed using memory-safe programming languages. Ensuring other applications running on host system 104 to be memory-safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating system can be loaded through a hypervisor. Note, a hypervisor or a virtual machine manager is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 205 runs and creates TEE 201, which places runtime libraries 205 in a trusted memory space associated with CPU 213. Next, user application 203 is launched in TEE 201. In one embodiment, user application 203 and runtime libraries 205 are statically linked and launched together. In another embodiment, runtime 205 is launched in TEE first and then user application 205 is dynamically loaded in TEE 201. In another embodiment, user application 205 is launched in TEE first, and then runtime 205 is dynamically loaded in TEE 201. Note, statically linked libraries are libraries linked to an application at compile time. Dynamic loading can be performed by a dynamic linker. Dynamic linker loads and links shared libraries for running user applications at runtime. Here, user applications 203 and runtime libraries 205 within TEE 201 are visible to each other at runtime, e.g., all process data are visible to each other. However, external access to the TEE is denied.

In another embodiment, the user application can only call a kernel from a set of kernels as predetermined by runtime libraries 205. In another embodiment, user application 203 and runtime libraries 205 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In summary, system 200 provides multiple layers of protection for DP accelerators (such as communications of data such as machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory-safe programming languages, which can further eliminate attacks by eliminating potential memory corruptions/vulnerabilities. Moreover, system 200 can include applications that use side-channel free algorithms so to defend against side channel attacks, such as cache based side channel attacks.

Figure 3A:
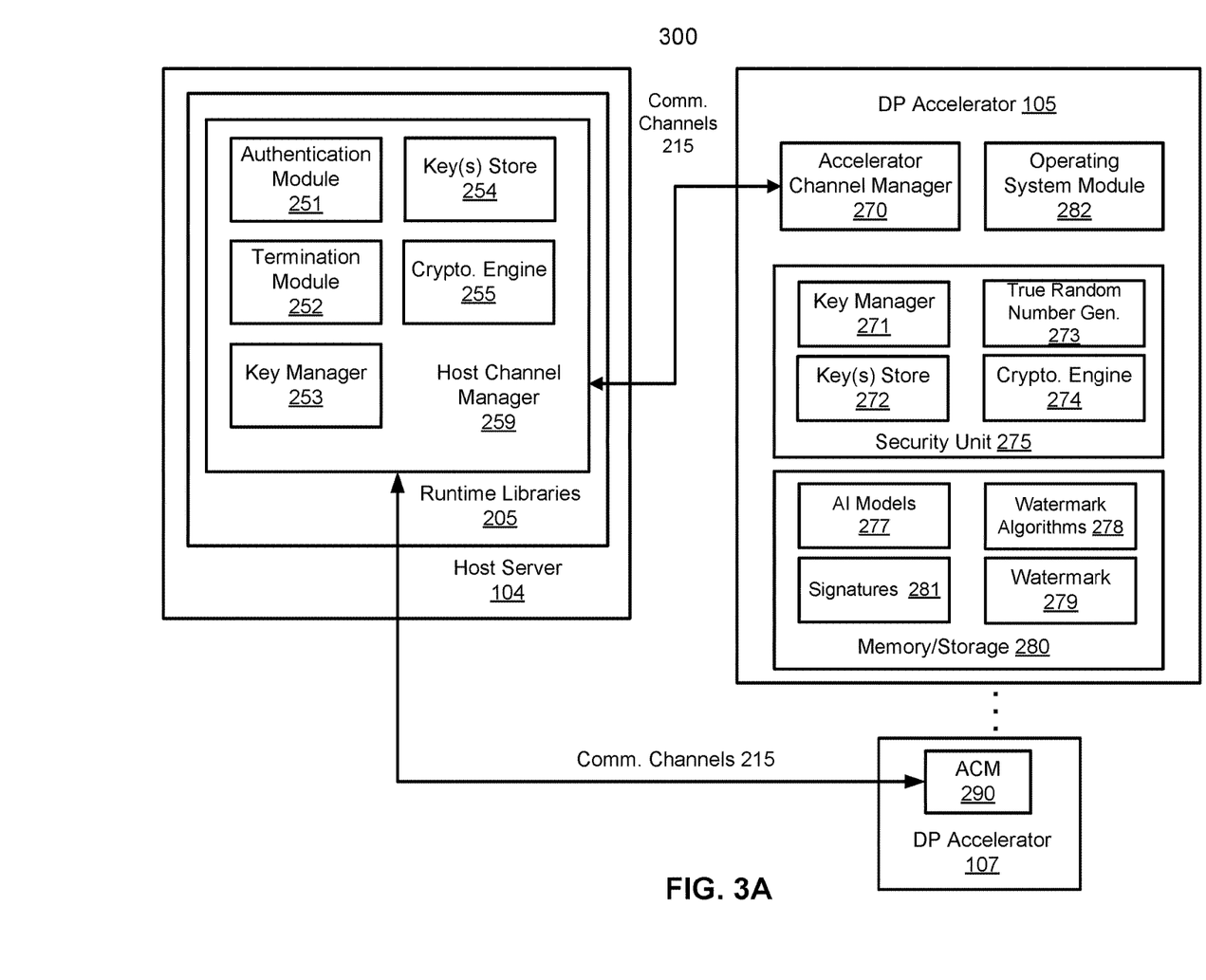
FIG. 3A is a block diagram illustrating a host in communication with data processing accelerators according to one embodiment.

FIG. 3A is a block diagram illustrating a host in communication with data processing accelerators according to one embodiment. System 300 may be a detailed view for portions of system 200 of FIG. 2. Referring to FIG. 3A, in one embodiment, host system 104 includes runtime libraries 205 which includes host channel manager (HCM) 259. In one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 203 of FIG. 2) can correspond or map to different secure data exchange channels, on a one-to-many relationship, and each data exchange channel can correspond to a DP accelerator. Key(s) store 254 can store encryption asymmetric key pairs or symmetric keys. Cryptography engine 255 can encrypt or decrypt a data packet for the data exchanged through any of the secure channels.

Referring to FIG. 3A, in one embodiment, DP accelerator 105 includes ACM 270 (similarly DP accelerator 107 includes 290) and security unit (SU) 275. Security unit 275 can contain one or more RSA key pairs (e.g., public and private key pairs) called endorsement keys (EK) or endorsement credentials (EC), i.e., root keys. The key pairs are maintained inside security unit 275 and cannot be accessed by third-party software. Security unit can then encrypt data or generate other security keys (which in turn can be used to encrypt the data) using the EK or EC. Essentially the root credentials (EK/EC) is hardened onto security unit 275 for cryptography purposes. In some embodiments, ACM 270 and SU 275 is an integrated module.

DP accelerator 105 can further include memory/storage 280 that includes artificial intelligence (AI) model(s)/algorithms 277, kernel(s) 278 (including predefined, user-specific, or DPA vendor-specific kernels, etc.), and data 279.

In one embodiment, DP accelerator (DPA) 105 includes operating system module 282 (similarly DP accelerator 107 includes operating system module 292). Operating system module 282 can include an operating system, e.g., a software module that supports computer functions, such as scheduling tasks, executing applications, and controlling hardware resources. The operating system can be an embedded operating system or a real-time operating system. The operating system can schedule tasks/commands and manage resources (computing units, memory) for the DPA. In one embodiment, operating system module 282 can be implemented either as a software-based module (e.g., as part of memory/storage 280) or a hardware-based module based on a FPGA, ASIC, and/or a microcontroller unit.

As discussed previously, referring to FIG. 3A, runtime libraries 205 can provide a predetermined set of (e.g., predefined) kernels for execution by user applications. Runtime libraries 205 can convert API calls to kernels executions and convert kernels executions to data, configuration, and/or control commands for execution by the DPA. The DPA can then receive the commands (e.g., data, control and configuration commands) and launches the commands for execution by the DPA. A typical task/job may require hundreds of commands communicated from host 104 to DPA 105, in which case, the cost for communicating the commands over communication channels 215 is high.

Although runtime libraries 205 and drivers 209 of host 104 include information of the hardware resources of accelerator 105, however, accelerator 105 can include a real-time operating system to provide the set of kernels, drivers, resource management, and/or task schedulers to schedule tasks for execution, similarly to the scheduling performed by runtime libraries 205 of host 104. In this case, runtime libraries 205 and drivers 209 are modified and tasks previously performed by runtime libraries 205 and drivers 209 are delegated to an operating system module 282 of DPA 105. For example, operating system module 282 of the DPA 105 can break down a task (such as an inference, or training task) into many subtasks (e.g., kernels) and further break down the subtasks to atomic commands (e.g., data, control, and configuration commands) to be executed by the DPA. Thus, the complexity of tasks is abstracted away from the runtime libraries of the host or the granularity of the commands launched by host 104 is at a high abstraction level.

Figure 3B:
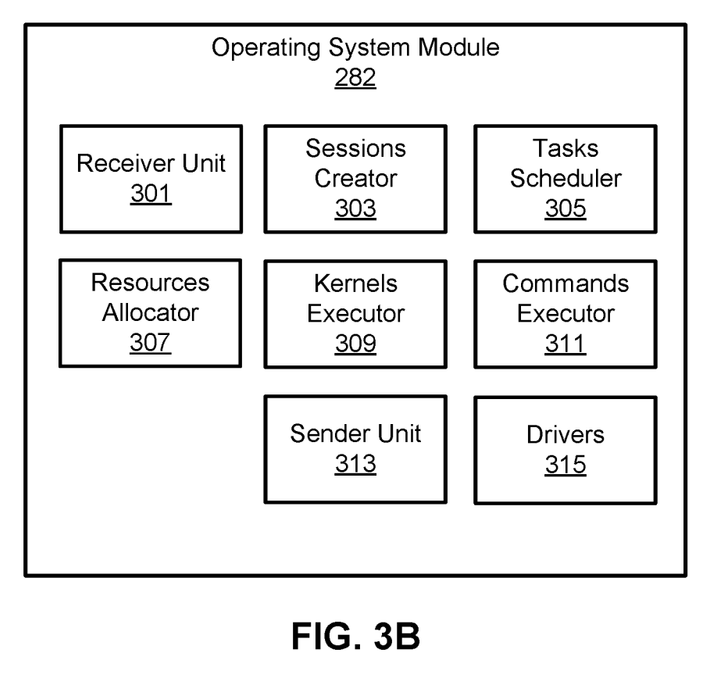
FIG. 3B is a block diagram illustrating an operating system module according to one embodiment.

FIG. 3B is a block diagram illustrating an operating system module according to one embodiment. Operating system module 282 can include receiver unit 301, sessions creator 303, tasks scheduler 305, resources allocator 307, kernels executor 309, commands executor 311, sender unit 313, and drivers 315. Receiver unit 301 can receive data from a host server. The data can include driver files for the DPA, kernels data, AI models data, etc. Sessions creator 303 can create a session context (or a kernel space/scope) for a data processing tasks (or kernel execution). A session context or context can access/read/write resources or data of commands and tasks of a requesting application for a user session. Tasks scheduler 305 can schedule one or more task for execution by the DPA. Tasks scheduler 305 can determine a plurality of kernels to be executed to complete a task and schedule the plurality of kernels for execution. Resources allocator 307 can allocator/de-allocator computing resources and memory resources of the DPA to execute the plurality of kernels. Kernels executor 309 can launch and execute a kernel. Examples of kernels can include kernels to preprocess a data object or to apply a function to a data object. Commands executor 311 can launch and execute data, control, kernel, and configuration commands to complete execution for the plurality of kernels. Control commands include commands to control which hardware resources of the DPA are used to execute a kernel. Data commands can include commands to manipulate data, e.g., placing data onto a particular memory location or applying an arithmetic operation to the data. Configuration commands can include commands to configure a context (or settings/environment) in which data commands are to be executed. Sender unit 313 can send a completion acknowledge and/or execution results to a host. Drivers 315 includes one or more driver files to enable operating system module 282 to access, use, and manage hardware resources of the DPA 105.

Figure 4:
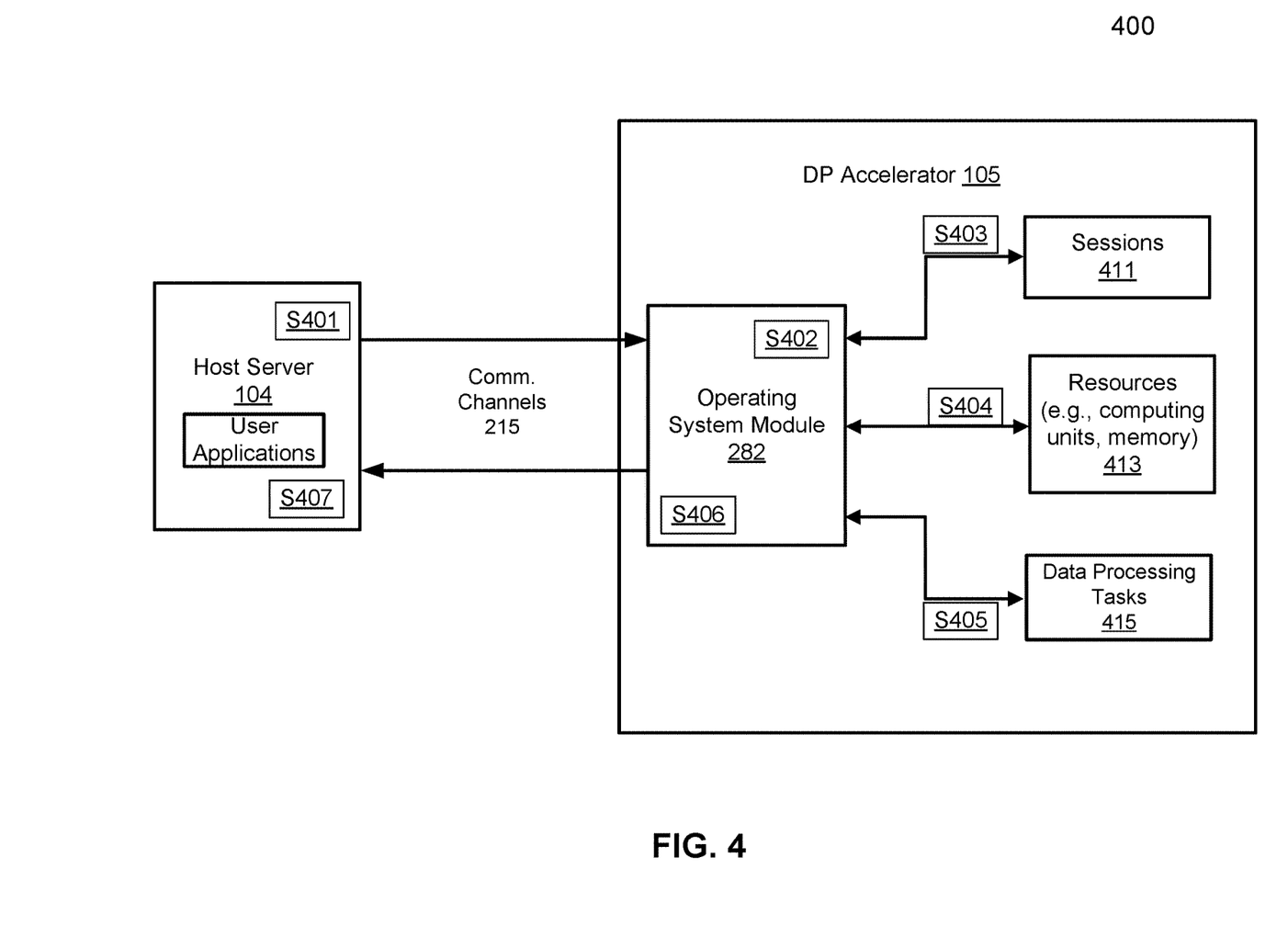
FIG. 4 is a block diagram illustrating example operations of an operating system module according to one embodiment.
Figure 5:
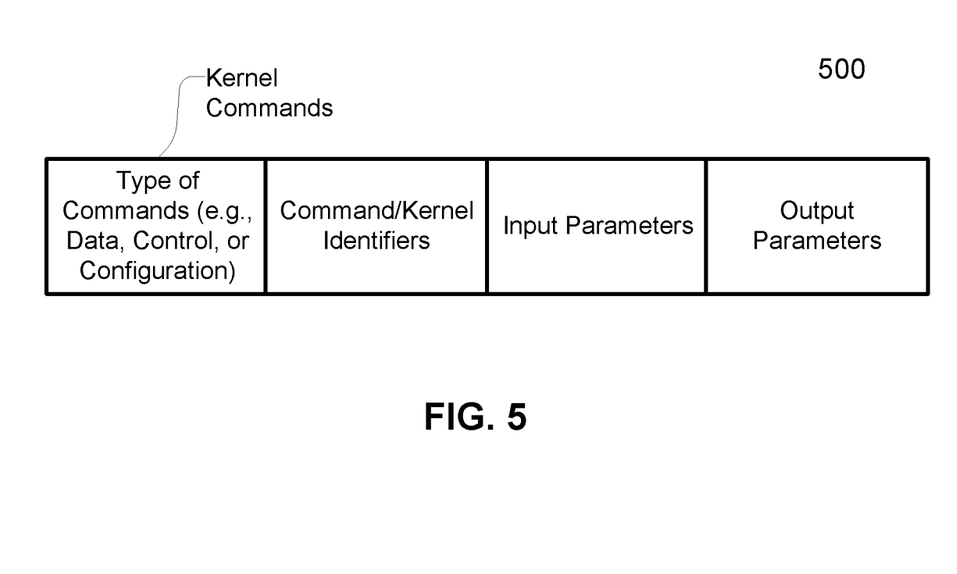
FIG. 5 is a block diagram illustrating an example of a kernel-type command according to one embodiment.
Figure 6:
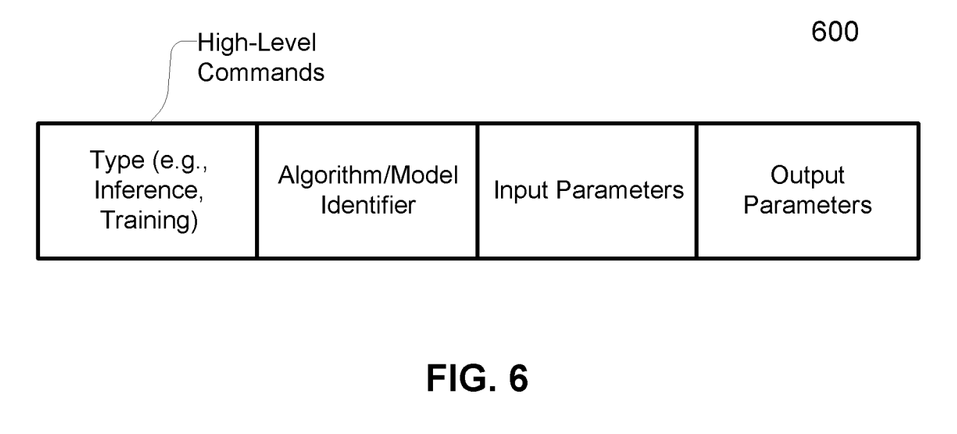
FIG. 6 is a block diagram illustrating an example of a task-type command according to one embodiment.

FIG. 4 is a block diagram illustrating example operations of an operating system module according to one embodiment. Referring to FIG. 4, in one embodiment, in operation S401, a user application request resources and tasks executions by the DPA via a communication between host server 104 and DPA 105. Operations S402-S406 can be performed by operating system module 282 in response to the request. In one embodiment, the application request includes a request for a high-level task/operation (e.g., a training or inference operation to be applied to some input data based on an AI algorithm/model). In this case, instead of determining and scheduling kernels or individual atomic commands to complete the requested operation by runtime libraries of host 104, host 104 directly sends/forwards the request to DPA 105 for the high-level operation to be executed by the DPA. In one embodiment, the request includes the high-level operation sent to the DPA via a high-level command format as illustrated in FIG. 6. Referring to FIG. 6, in one embodiment, the command format can include formatting fields such as type of command, AI algorithm/model identifier (name/versions), input parameters, and/or output parameters (output parameters are optional). Without the operation system module, a host typically requests subcommands/granular tasks via a low-level command format as illustrated in FIG. 5, to complete a requested operation. Referring to FIG. 5, in one embodiment, the command format can include formatting fields such as type of command (e.g., data, control, or configuration), command/kernel names/identifier, input parameters, and/or output parameters (output parameters are optional).

In operation S402, operating system (OS) module 282 of DPA 105 receives the request and parses the request to determine the type of operation, input data, and one or more algorithms/models to be executed. Upon receiving the request, in operation S403, OS module 282 creates a session (as part of sessions 411) to provide a context/environment for execution of the requested operation. In one embodiment, the session is identified by a session identifier associated with the requesting application. In one embodiment, the session can create a sandbox environment to isolate the session executions from other sessions. In one embodiment, the session created can be a virtual session for a virtual environment to virtualize one or more data processing resources of the DPA.

In operation S404, OS module 282 allocates resources 413 to execute the requested operation. Examples of resources include the processing/computing units and memory associated with the DPA. OS module 282 can determine the portion of available resources as part of the total available resources. In one embodiment, OS module 282 can allocate the resources based on the determined available resources and the resource required to complete the requested operation.

In operation S405, OS module 282 can schedule a plurality of kernels/atomic commands (as part of data processing tasks 415) to be performed to complete the requested operation. In one embodiment, OS module 282 determines and instantiates one or more kernel executors based on the processing tasks 415. The kernel executors specify one or more commands to be executed by DPA 105. In one embodiment, OS module 282 determines and schedules one or more commands for each of the kernel executors to be executed by DPA 105.

In operation S406, OS module 282 obtains a completion acknowledgement indicating the operation requested by the user application is complete. In operation S407, module 282 sends a completion acknowledgement and any data processing results to the requesting user application via host 104. Although the OS module is discussed only with respect to DPA 105 for clarity purposes, other DPAs can have similar OS modules with similar functionalities.

Figure 7:
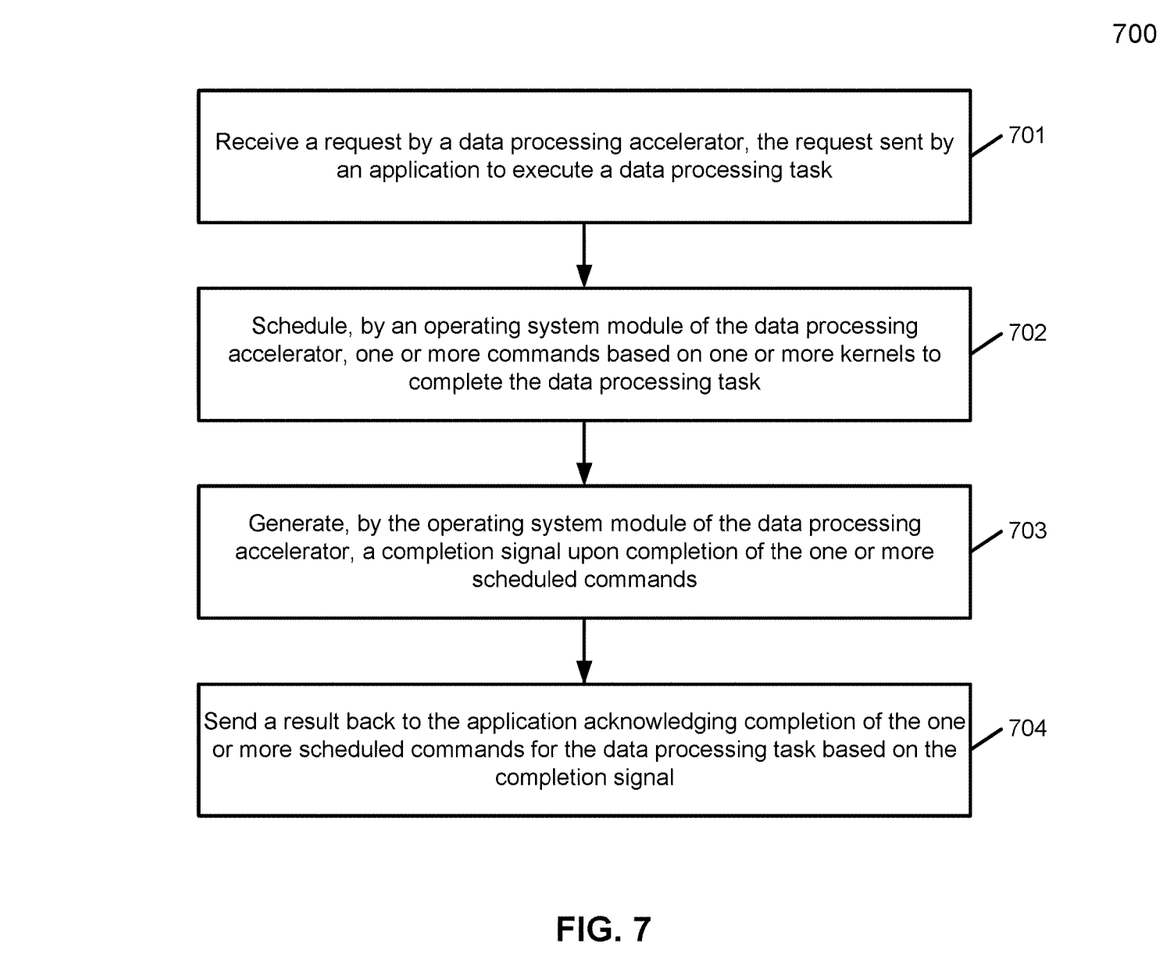
FIG. 7 is a flow diagram illustrating a method performed by a DP accelerator according to one embodiment.

FIG. 7 is a flow diagram illustrating a method performed by a DP accelerator according to one embodiment. Process 700 may be performed by processing logic which may include software, hardware, or a combination thereof. For example, process 700 may be performed by a DP accelerator, such as DP accelerator 105 of FIG. 3A. Referring to FIG. 7, at block 701, processing logic receives a request by a data processing accelerator, the request sent by an application to execute a data processing task. At block 702, processing logic schedules, by an operating system module of the data processing accelerator, one or more commands based on one or more kernels to complete the data processing task. At block 703, processing logic generates, by the operating system module of the data processing accelerator, a completion signal upon completion of the one or more scheduled commands. At block 704, processing logic sends a result back to the application acknowledging completion of the one or more scheduled commands for the data processing task based on the completion signal.

In one embodiment, processing logic further creates an application session context for the data processing task, where the application session context is isolated from contexts of application sessions of other data processing tasks of the data processing accelerator. In another embodiment, the isolation isolates resources for the data processing task from resources for the other data processing tasks of the data processing accelerator. In one embodiment, processing logic further allocates, by the operating system module of the data processing accelerator, resources for the data processing task, where the resources include computing resources and memory resources.

In one embodiment, request is sent by an application through a host, wherein the host assigns one or more data processing tasks to one or more data processing accelerators. In another embodiment, the host is relieved of the scheduling and managing of the one or more commands required to complete a data processing task. In one embodiment, processing logic further receives one or more kernels from the host, the one or more kernels comprising instructions to execute the one or more commands to complete a data processing task.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
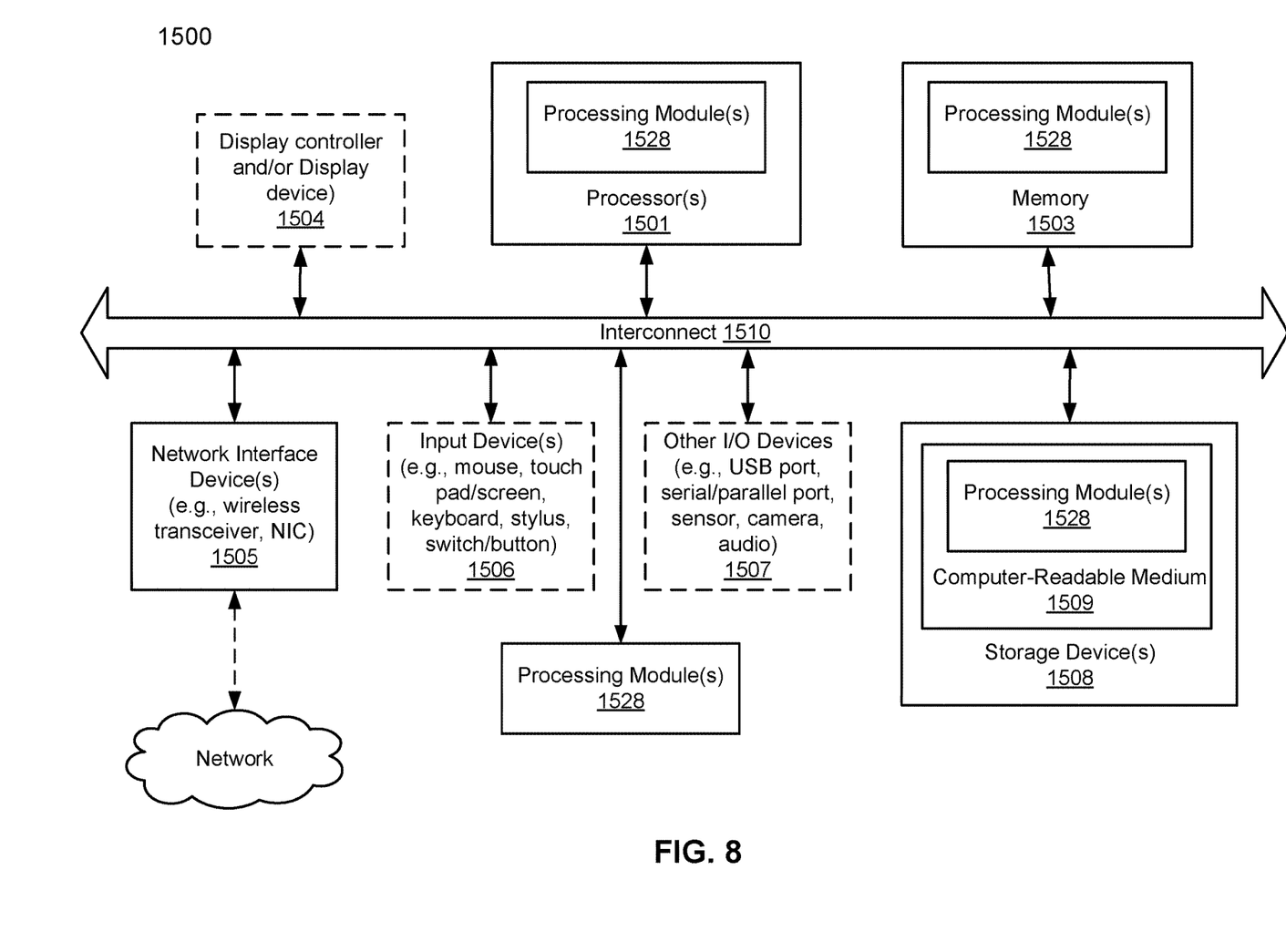
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, a client device, a host, or a DP accelerator described above, such as, for example, clients 101-102, host server 104, or DP accelerator 105 of FIG. 1, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104, DPA 105, or operating system module 282 of FIG. 3A, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing data by a data processing accelerator, the method comprising:
  receiving a request by a data processing accelerator, the request sent by an application to execute a data processing task;
  scheduling, by an operating system module of the data processing accelerator, one or more commands based on one or more kernels to complete the data processing task;
  generating, by the operating system module of the data processing accelerator, a completion signal upon completion of the one or more scheduled commands; and
  sending a result back to the application acknowledging completion of the one or more scheduled commands for the data processing task based on the completion signal.

2. The method of claim 1, further comprising creating an application session context for the data processing task, wherein the application session context is isolated from contexts of application sessions of other data processing tasks of the data processing accelerator.

3. The method of claim 2, wherein the isolation isolates resources for the data processing task from resources for the other data processing tasks of the data processing accelerator.

4. The method of claim 1, further comprising allocating, by the operating system module of the data processing accelerator, resources for the data processing task, wherein the resources include computing resources and memory resources.

5. The method of claim 1, wherein the request is sent by an application through a host, wherein the host assigns one or more data processing tasks to one or more data processing accelerators.

6. The method of claim 5, wherein the host is relieved of the scheduling and managing of the one or more commands required to complete a data processing task.

7. The method of claim 1, further comprising receiving one or more kernels from the host, the one or more kernels comprising instructions to execute the one or more commands to complete a data processing task.

8. A non-transitory machine-readable medium having instructions stored therein, which when executed by a processor, cause the processor to perform one or more operations, the operations comprising:
  receiving a request by a data processing accelerator, the request sent by an application to execute a data processing task;
  scheduling, by an operating system module of the data processing accelerator, one or more commands based on one or more kernels to complete the data processing task;
  generating, by the operating system module of the data processing accelerator, a completion signal upon completion of the one or more scheduled commands; and sending a result back to the application acknowledging completion of the one or more scheduled commands for the data processing task based on the completion signal.

9. The non-transitory machine-readable medium of claim 8, wherein the operations further comprise creating an application session context for the data processing task, wherein the application session context is isolated from contexts of application sessions of other data processing tasks of the data processing accelerator.

10. The non-transitory machine-readable medium of claim 9, wherein the isolation isolates resources for the data processing task from resources for the other data processing tasks of the data processing accelerator.

11. The non-transitory machine-readable medium of claim 8, wherein the operations further comprise allocating, by the operating system module of the data processing accelerator, resources for the data processing task, wherein the resources include computing resources and memory resources.

12. The non-transitory machine-readable medium of claim 8, wherein the request is sent by an application through a host, wherein the host assigns one or more data processing tasks to one or more data processing accelerators.

13. The non-transitory machine-readable medium of claim 12, wherein the host is relieved of the scheduling and managing of the one or more commands required to complete a data processing task.

14. The non-transitory machine-readable medium of claim 8, wherein the operations further comprise receiving one or more kernels from the host, the one or more kernels comprising instructions to execute the one or more commands to complete a data processing task.

15. A data processing system, comprising:
a processor; and
a memory coupled to the processor to store instructions, which when executed by the processor, cause the processor to perform operations, the operations including
receiving a request by a data processing accelerator, the request sent by an application to execute a data processing task;
scheduling, by an operating system module of the data processing accelerator, one or more commands based on one or more kernels to complete the data processing task;
generating, by the operating system module of the data processing accelerator, a completion signal upon completion of the one or more scheduled commands; and
sending a result back to the application acknowledging completion of the one or more scheduled commands for the data processing task based on the completion signal.

16. The system of claim 15, wherein the operations further comprise creating an application session context for the data processing task, wherein the application session context is isolated from contexts of application sessions of other data processing tasks of the data processing accelerator.

17. The system of claim 16, wherein the isolation isolates resources for the data processing task from resources for the other data processing tasks of the data processing accelerator.

18. The system of claim 15, wherein the operations further comprise allocating, by the operating system module of the data processing accelerator, resources for the data processing task, wherein the resources include computing resources and memory resources.

19. The system of claim 15, wherein the request is sent by an application through a host, wherein the host assigns one or more data processing tasks to one or more data processing accelerators.

20. The system of claim 19, wherein the host is relieved of the scheduling and managing of the one or more commands required to complete a data processing task.

21. The system of claim 15, wherein the operations further comprise receiving one or more kernels from the host, the one or more kernels comprising instructions to execute the one or more commands to complete a data processing task.

* * * * *